ND# United States [11] 3,630,603

[72] Inventor Eugene C. Letter
 90 Royal View Drive, Rochester, N.Y. 14625
[21] Appl. No. 525,620
[22] Filed Feb. 7, 1966
[45] Patented Dec. 28, 1971

[54] LIGHT-CONTROL DEVICE AND SPECTACLES USING REVERSIBLE OXIDATION REDUCTION REACTIONS IN A MATERIAL CONTAINING LEAD FLUORIDE
7 Claims, 5 Drawing Figs.

[52] U.S. Cl.............................................. 351/44, 350/160
[51] Int. Cl....................................... G02f 1/36
[50] Field of Search........................... 350/160, 161, 150; 351/44; 332/7.51

[56] References Cited
UNITED STATES PATENTS
2,632,045 3/1953 Sziklai.......................... 350/150 X
3,245,315 4/1966 Marko et al. ................. 350/150
3,303,488 2/1967 Anderson..................... 350/160 X OTHER REFERENCES
Williams: " Effect of a High Electric Field on the Absorption of Light by $PbI_2$ and $HgI_2$," Physical Review, Vol. 126, pp. 442– 46, April 15, 1962

*Primary Examiner*—Ronald L. Wibert
*Assistant Examiner*—Edward S. Bauer
*Attorneys*—Frank C. Parker, Arthur L. Nelson and Charles C. Krawczyk ABSTRACT: Disclosed is an optical device comprising a pair of electron conducting electrodes separated by a solid-state electrolytic layer containing ions available for reversible oxidation and reduction reactions in response to an electrical potential applied across the electrodes.

PATENTED DEC28 1971

EUGENE C. LETTER
*INVENTOR.*

BY *Charles C. Krauzyk*

ATTORNEY

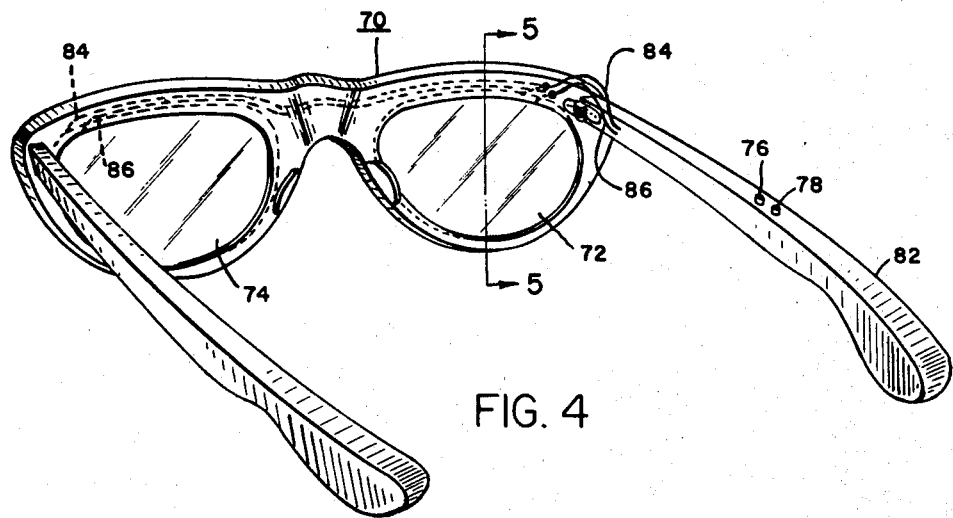
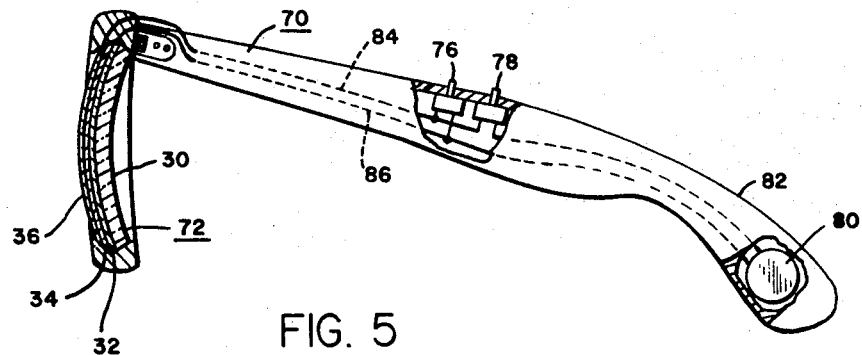

LIGHT-CONTROL DEVICE AND SPECTACLES USING REVERSIBLE OXIDATION REDUCTION REACTIONS IN A MATERIAL CONTAINING LEAD FLUORIDE

This invention relates to a novel optical device and more particularly to an optical device having electrically responsive variable optical properties.

In various optical systems, the intensity, wavelength, etc., of radiation received by an element is controlled in a predetermined manner to produce a desired effect. At the present, this is generally mechanically accomplished by the use of filters, optical wedges, occluders, adjustable slits and apertures, etc. or electrically by the use of electrically responsive devices such as Kerr cells etc. The mechanical devices generally require a physical movement to exert the required amount of control. In the case of automated systems, these mechanical devices are motor driven in response to an electrical control signal. The motor, the drive coupling, etc. are generally complicated, expensive, and space consuming. A definite reduction in complexity, cost, and space can be achieved, by the use of optical devices adapted to have their optical properties directly controlled with an electrical signal. In addition, by eliminating the inertial time lag including in all mechanical systems, a system including an electrically controlled optical device will have a response time superior to that achieved mechanically. Furthermore, by eliminating such mechanical nonlinearities as dead-band and friction, the system can also achieve greater accuracy.

Presently available electrically responsive optical devices for directly controlling the intensity, wavelength, etc. of radiation received by an element such as Kerr cells or Pockel's cells require a continuous potential applied thereto to maintain the desired amount of control. In addition, these cells require extremely high potentials for operation thereof. For example, the Kerr cell requires a potential in the order of 40,000 volts while a device using the Pockel's effect requires a potential in the order of 7,000 volts. Furthermore the Kerr and Pockel's cells produce a polarizing effect and therefore are required to be used in conjunction with polarized light to be effective.

It is therefore an object of this invention to provide a new and improved optical device.

It is also an object of this invention to provide a new and improved optical device adapted to have its optical properties electrically controlled.

It is also an object of this invention to provide a new and improved optical device adapted to have its optical properties controlled by the application of a low voltage.

It is also an object of this invention to provide a new and improved optical device adapted to have its optical density changed by applying an electrical potential thereto and that retains the optical density substantially as changed when the electrical potential is removed.

It is still a further object of this invention to provide a new and improved solid-state device whose optical properties are bidirectionally controlled as a function of electrical energy applied thereto.

The optical device according to the present invention comprises a pair of electronic conductive electrodes separated by a solid-state electrolytic reactive film containing ions which are available for reducing and oxidizing reactions. In response to an electrical potential applied across the conductive electrode a current conduction is initiated by an ionic transport phenomenon resulting in reversible reducing and oxidizing reactions in the reactive film thereby changing the optical properties of the device.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings, in which:

FIG. 4 is an illustration of a pair of sunglasses including the optical device of FIG. 2.

FIG. 5 is a cross-sectional view of the sunglasses of FIG. 4 taken along the lines 5—5.

While the invention is described with reference to a glass film containing lead and fluoride ions or a crystalline film containing lead and fluoride ions, it is to be understood that it is not intended to limit the invention to these specific compositions. Many and various reactive films which contain ions available for reducing and oxidizing reactions will produce similar results when treated in accordance with the methods disclosed herein.

Figure 1:
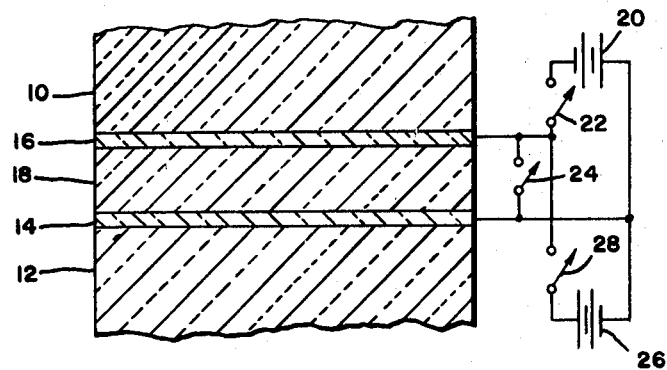
FIG. 1 is a cross-sectional view of a first embodiment of an optical device including the invention.

An optical device shown in FIG. 1 includes a pair of substrates or bases 10 and 12 for supporting the multilayer film device. The substrates 10 and 12 may be glass plates or any other suitable transparent material. A pair of electron conducting layers 14 and 16 are disposed between the substrates 10 and 12 respectively and a solid electrolytic reactive layer 18 having ions available for reducing an oxidizing reactions. The electron conducting layers 14 and 16 may, by way of example, be a semiconducting coating of tin oxide, indium oxide, nickel oxide or cadmium fluoride, or a thin coating of metal such as gold, silver, copper, etc. or a combination of such materials. The reactive layer 18 may, for example, comprise a glass composition containing lead fluoride having lead cations available for reducing and oxidizing reactions and fluoride mobile anions such as $a$ PbO · $b$ PbF$_2$ · $C$SiO$_2$ · $d$ B$_2$O$_3$ having a mole ratio designated as "$a$," "$b$," and "$c$" and "$d$" wherein $a$ varies from one-quarter to 2, $b$ varies from one-eighth to 1, $c$ varies from 0 to 1 and $d$ varies from 0 to one-half. For example, the glass composition may comprise of PbO · ½ PbF$_2$ · SiO$_2$ or PbO · ½ PbF$_2$ · ½ B$_2$O$_3$, or PbO · ½ PbF$_2$ · ½ SiO$_2$ · ¼ B$_2$O$_3$. These glass compositions have reducible and oxidizable lead cations and mobile conducting fluoride anions available for entering into reducing and oxidizing reactions. An example of other material having ions available for reducing and oxidizing reactions are compositions including bismuth fluoride or lanthanum fluoride doped with strontium and cerium.

The optical device described above may be produced by initially placing the substrates 10 and 12 in a vacuum chamber at a suitable reduced pressure and conventionally depositing a coating of tin oxide by a "sputtering" process described in a U.S. Pat. No. 3,139,396 granted to W. R. Sinclair on June 30, 1964. Alternatively commercially available electrically conducting glass having a thin coating of tin oxide and a softening point in the order of 700° C. or greater can be used. The resistance of the tin oxide coating should preferably be in the order of 50–10,000 ohms per square. Selected sizes of conventionally cleaned electrically conducting glass are placed into a furnace and heated to a temperature in the order of 600° C. The size and the coefficient of expansion of the substrate material used dictates the rapidity at which the substrates are brought up to the temperature. For example, thick substrates or substrates with high coefficients of expansion should be exposed to the raised temperature more gradually than thinner substrates or substrates having lower coefficients of expansion. With substrates 1 inch in diameter, a glass bead or a composition containing lead fluoride, as previously mentioned, having a diameter in the order of one-eighth of an inch is placed on one of the tin oxide surfaces of the substrates to form the reactive layer 18. The bead fuses at this temperature and slowly spreads over the substrate. When the bead has spread to a diameter of approximately one-fourth of an inch, the other preheated tin oxide surface of the second substrate is placed on the lead fluoride composition and the substrates are firmly pressed together.

The multilayer device is now removed from the furnace and placed upon a plate preheated to a temperature of approximately 200° C. for cooling to produce an amorphous reactive layer. The optical device may be operated at this temperature. If desired to operate the optical device at room temperature the device should be cooled rapidly, which by way of example, may include placing the external substrate surfaces between a pair of room temperature surfaces so that both substrates cool at approximately the same rate. The optical device is cooled rapidly to room temperature in this manner to insure increased ionic conduction in the reactive layer 18.

When a voltage, supplied by a source of potential illustrated as the battery 20, is applied across the two electron conducting layers 14 and 16 by closing a switch 22, an ionic current flows through the reactive layer 18 changing the optical properties of the device such as the effective refractive index, the optical density, etc. The rate at which the optical properties of the device change is a function of the magnitude of the potential placed across the electron conducting layers and the temperature of the device. For example, a 2:1 change in optical density has been observed in 1 second for a potential in the order of 2.5–5 volts at 200° C. wherein the same change in optical density at room temperature will require a longer period of time. However, even at room temperature small changes have been observed with current pulses less than 1 millisecond in duration.

The change in optical properties in response to the applied electrical potential can be effectively considered to be a result of the formation of reduced lead ($Pb^0$) forming in the reactive layer 18 adjacent to the negative electrode 16. Ionic conduction in the reactive layer 18 can result when the electrons stored on the electrode 16 repel fluoride ions (mobile anions) into openings in the amorphous structure of the reactive layer 18 resulting in an ionic conduction away from the electrode 16. Electrons from the tin oxide layer 16 combine with the divalent lead ions to produce reduced lead changing the optical properties of the device such as increasing its optical density. Electrons flow from the electrode 18 back to the source by changing divalent lead to tetravalent lead as the fluoride ions move towards the electrode 14 thereby completing the ionic conduction through the reactive layer 18.

The optical properties of the device will remain substantially as changed when the potential is removed by opening the switch 22. If the optical properties of the device are to be reversed back to approximately its original condition, the electrode 14 and 16 can be shorted together by closing the switch 24. The optical properties can be more rapidly reversed by applying an opposite potential (opposite that supplied by the battery 20), in the order of 1 volt, supplied by a source of potential illustrated as the battery 26, by closing the switch 28.

It should be noted that the optical device of FIG. 1 also effectively functions as an electrochemical storage cell. After the switch 22 has been closed and subsequently opened, a charge is stored between the electrodes 14 and 16. A current flow results when the switch 24 is closed due to the stored charge.

Figure 2:
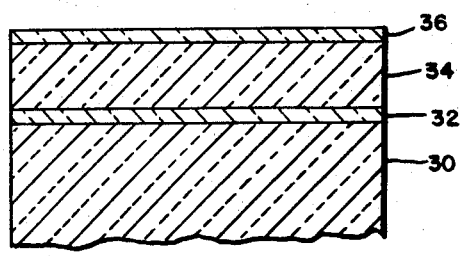
FIG. 2 is a cross-sectional view of a second embodiment of an optical device including the invention.

The optical device in FIG. 2 includes a single glass substrate 30 upon which an electron conducting film 32 is disposed. A reactive layer 34 containing ions available for reducing and oxidizing reactions is formed on the electron conducting layer 32. A second electron conducting layer 36 is formed on top of the active layer 34. By placing a potential across the electron conducting layers 32 and 36, the optical properties of the layer 34 are changed and reversed back to substantially its original optical condition in the same manner as previously described with regards to FIG. 1.

The optical device of FIG. 2 can be made by conventional evaporation techniques. For example, the substrate 30 containing a tin oxide electron conducting layer 32 of the type previously described with regards to FIG. 1, is put into a vacuum chamber having a clean vacuum of at least $10^{-4}$ torr. Care should be taken to eliminate organic and other types of contamination that may produce excessive reduction. A crystalline reactive layer 34 of lead fluoride or lead fluoride containing impurities such as oxygen, bismuth or silver is now conventionally deposited from a platinum boat by vacuum techniques on the tin oxide layer 32. It is desirable to maintain the substrate at room temperature or below if a high degree of ionic conduction is desired. The electron conducting layer 36 is not conventionally evaporated in the form of silver or gold or as tin oxide with sputtering techniques. The thickness of the layer 36 should be in the order of 10 quarter wavelengths for light of 435 millimicrons.

The reactive layer 34 can also be made of the above mentioned glass compositions with regards to the reactive layer 18 of FIG. 1, by conventional flash evaporation techniques. By flash evaporation techniques we mean placing the substrate 30 having the tin oxide layer 32 into a vacuum chamber, preheating a boat, such as a platinum boat, to a temperature in the order of 1,600° C. and dropping pellets of material on the boat, so that the pellets are immediately, or flash heated and thereby evaporation deposited on the tin oxide layer 32.

The optical device of FIG. 1 and 2 can be modified to include a PN-type junction between one of the electron conducting layers and the reactive layer. The heating and cooling procedures used to make certain of the above-mentioned glass compositions determines whether the glass is primarily an electron conductor or an ionic conductor. For example, if the above compositions mentioned with regards to the reactive layer 18 of FIG. 1 are cooled rapidly, they tend to exhibit ionic conduction-type characteristics. On the other hand if they are cooled slowly they tend to exhibit N-type semiconductor conduction characteristics. By substituting a P-type material such as nickel oxide for the layers 16 and 36 of FIGS. 1 and 2 respectively, and using a glass composition such as $PbO \cdot \frac{1}{2} PbF_2 \cdot \frac{1}{2} B_2O_3$ or the glass compositions specified with regards to the layer 18 of FIG. 1 for the reactive layers 18 and 34 of FIGS. 1 and 2 respectively, a PN-type junction is formed between the layers 16 and 18 and the layers 34 and 36. By connecting the negative terminal of a source of potential to the P-type layer (layers 16 and 36) and the positive terminal to the other layer (14 and 32), the PN-junction is reversed biased creating a barrier and effectively eliminating electronic conduction at the reactive layer (layer 18 and 34). An ionic current conduction occurs resulting in the reducing and oxidizing reactions thereby changing the optical properties of the device.

Figure 3:
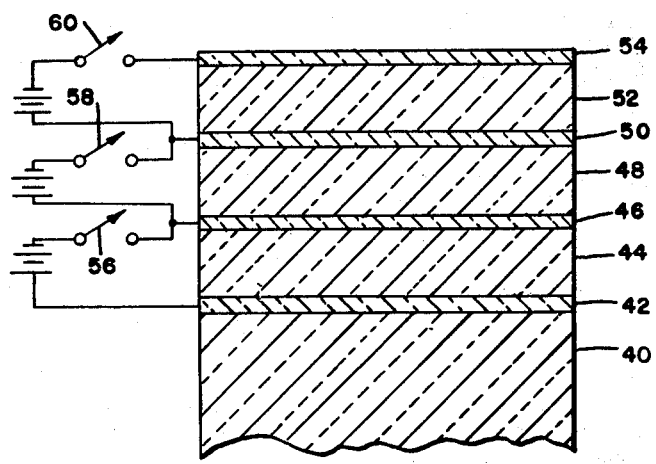
FIG. 3 is a cross-sectional view of a third embodiment of an optical device including the invention.

FIG. 3 is an embodiment of an optical device including the invention wherein a plurality of layers are consecutively stacked to produce a device having a plurality of individually electrically responsive variable optical density layers that are electrically controlled to cooperate to control the overall optical density of the device. The device includes a single glass substrate 40 having a tin oxide electron conducting layer 42 of the type previously described with regards to FIGS. 1 and 2. A reactive layer 44 containing ions available for reducing and oxidizing reactions is disposed between the electron conducting layer 42 and a second electron conducting layer 46. A second similar reactive layer 48 is disposed between the electron conducting layer 46 and a third electron conducting layer 50. A third similar reactive layer 52 is disposed between the electron conducting layer 50 and a 52 is disposed between the electron conducting layer 50 and a fourth electron conducting layer 54. Although the device is illustrated with three reactive layers 44, 48 and 52, it is to be understood that any number of such layers can be included disposed between pairs of electron conducting layers. The device of FIG. 3 may be made by repeating the process of evaporating consecutive reactive and electron conducting layers in the same manner as set forth with regards to FIG. 2.

The optical properties of the device of FIG. 3 are adapted to be changed by applying a potential between the electrodes 42 and 46, 46 and 50, and 50 and 54 by closing the switches 56, 58 and 60 respectively. The switches can be closed simultaneously or individually to provide the desired amount of change in optical properties at a desired rate. The optical properties of the device of FIG. 3 can be reversed back to approximately its original optical properties by placing a short across the pairs of electrodes or a reverse polarity as previously described with regards to FIG. 1.

The pair of sunglasses 70 illustrated in FIGS. 4 and 5 includes the optical device of FIG. 2 as the lenses 72 and 74 to provide a pair of electrically variable density sunglasses. For convenience of illustration the same reference numerals are used to designate the same layers of the optical device of FIG. 2 and the lenses 72 and 74. It is to be understood, however, that any of the devices of FIGS. 1 and 3 can also be employed as the lenses 72 and 74. A pair of pushbuttons 76 and 78 and a miniature battery 80 are enclosed within a temple 82 and are connected through the wires 84 and 86 (partially enclosed within the frame of the sunglasses) to the lenses 72 and 74 to control the optical density thereof. The pushbutton 78 is connected in the similar manner as the switch 22 of FIG. 1 to provide an electrical potential across the electron conducting layers 32 and 36 of the lenses 72 and 74 (as illustrated in the cross-sectional view of FIG. 5). The pushbutton 76 is connected in a similar manner as the switch 24 of FIG. 1 to discharge any charge stored between the electron conducting layers 32 and 36.

The optical properties of the lenses 72 and 74 change in response to the pushbuttons 76 and 78 in the same manner as set forth with regard to the switches 24 and 22 respectively. For example, if darker sunglasses are desired, the person wearing the sunglasses need only depress the switch 78 for a sufficient time duration to provide the desired optical density. On the other hand, if lighter sunglasses are desired the pushbutton 76 is depressed.

Although a single control means has been shown for simultaneously controlling the optical properties of both lenses 72 and 74, it is to be understood that a separate control may be provided in each sunglass temple for the individually controlling the optical density of the lenses 72 and 74.

I claim:

1. An optical device comprising a pair of electron-conducting electrodes, at least one of which is transparent, separated by a solid-state electrolytic film including a thin film of lead fluoride having ions available for reversible oxidation and reduction reactions in response to an electrical potential applied to the pair of electrodes for changing the optical properties of the device, the solid-state electrolytic film further containing mobile conducting ions.

2. An optical device comprising a pair of electron conducting electrodes, at least one of which is transparent, separated by a solid-state electrolytic film including a thin film selected from the group consisting essentially of $PbF_2$, $PbO \cdot \frac{1}{2} PbF_2$, $PbO \cdot \frac{1}{2} PbF_2 \cdot SiO_2$, $PbO \cdot \frac{1}{2} PbF_2 \cdot \frac{1}{2} B_2O_3$ and $PbO \cdot \frac{1}{2} PbF_2 \cdot \frac{1}{2} SiO_2 \cdot \frac{1}{4} B_2O_3$ having ions available for reversible oxidization and reduction reactions in response to an electrical potential applied to the pair of electrodes for changing the optical properties of the device, the solid state electrolytic film further containing mobile conducting ions.

3. An optical device comprising a pair of electron conducting electrodes, at least one of which is transparent, separated by a solid-state electrolytic film including a thin film of glass having a composition of $a$ $PbO \cdot b$ $PbF_2 \cdot c$ $SiO_2 \cdot d$ $B_2O_3$ wherein "$a$" is within the mole ratio in a range of one-half to 2, "$c$" is within the mole ratio in the range of one-eighth to 1, "$C$" is within the mole ratio in the range of 0 to 1 and "$d$" is within the mole ratio in the range of 0 to one-half, the solid-state electrolytic film having ions available for reversible oxidation and reduction reactions in response to an electrical potential applied to the pair of electrodes for changing the optical properties of the device, the solid-state electrolytic film further containing mobile conducting ions.

4. An optical apparatus comprising:
a transparent substratum for providing a support surface;
a first transparent electron-conductive coating disposed immediately adjacent to and coextensive with the support surface;
a solid-state ionic conductive layer including lead fluoride having ions available for reversible reducing and oxidizing reactions, the ionic conductive layer having one side disposed immediately adjacent to and coextensive with the first transparent electron conductive coating;
a second transparent electron-conductive coating disposed immediately adjacent to and coextensive with the remaining side of the solid state ionic conductive layer;
first means connected to the first and second electron conductive coatings for first means connected to the first and second electron conductive coatings for producing a potential gradient across the ionic conductive layer so that an ionic current flows through said ionic conductive layer causing oxidizing and reducing reactions thereby causing the optical properties of the ionic conductive layer to change and for removing the potential gradient when the desired change in optical properties is achieved, and
second means connected to the first and second electron conductive coatings for causing the optical properties of the ionic conductive layer to change back to approximately that of its original optical density.

5. The optical apparatus, as defined in claim 4, wherein:
the second means includes a low impedance path adapted to be connected between the first and second electron conductive layers for causing a reversed ionic current flow through the ionic conductive layers.

6. The optical apparatus, as defined in claim 4, wherein:
the second means includes means for applying a potential gradient across the ionic conductive layer having a polarity opposite that of the potential applied by the first means.

7. A pair of glasses comprising:
first and second lenses mounted in a frame, each comprising a pair of transparent electron conducting layers separated by a transparent electrical conducting film including lead fluoride capable of exhibiting a reversible chemical reaction due to electrical current flow therethrough in response to an electrical potential applied across the electron conducting layers, resulting in changeable optical properties;
first means at least partially disposed within the frames for applying an electrical potential across the pair of electron conducting electrodes of at least one of the first and second lenses for changing the optical properties thereof; and
second means at least partially disposed within the frame coupled to a pair of electron conducting electrodes for changing the optical properties of the lens back to approximately that of its original optical properties.

* * * * *